United States Patent [19]
Hall et al.

[11] Patent Number: 5,729,376
[45] Date of Patent: Mar. 17, 1998

[54] CATADIOPTRIC MULTI-FUNCTIONAL OPTICAL ASSEMBLY

[75] Inventors: John M. Hall, Alexandria; Dallas N. Barr, Woodbridge; Richard Utano, Springfield, all of Va.

[73] Assignee: The United States of America as represented by the Secretary of the Army, Washington, D.C.

[21] Appl. No.: 674,007

[22] Filed: Jul. 1, 1996

[51] Int. Cl.$^6$ ............... G02B 17/00; G02B 27/14; G02B 5/10

[52] U.S. Cl. .......... 359/366; 359/634; 359/731; 359/859

[58] Field of Search ............... 359/350–351, 359/353, 363–366, 726–732, 856–861, 583–584, 589, 618, 627, 629, 634, 636, 639–640

[56] References Cited

U.S. PATENT DOCUMENTS

| | | | |
|---|---|---|---|
| 4,547,045 | 10/1985 | Canzek | 359/731 |
| 4,881,796 | 11/1989 | Michika et al. | 359/589 |
| 4,971,428 | 11/1990 | Moskovich | 359/366 |
| 5,194,986 | 3/1993 | Carlson et al. | 359/353 |
| 5,497,266 | 3/1996 | Owen | 359/381 |

FOREIGN PATENT DOCUMENTS

| | | | |
|---|---|---|---|
| 170617 | 2/1986 | European Pat. Off. | 359/365 |

*Primary Examiner*—Thong Nguyen
*Attorney, Agent, or Firm*—Milton W. Lee; John E. Holford; Alain L. Bashore

[57] ABSTRACT

An optical assembly using a centrally-obscured catadioptric optical objective that provides two different focal planes using the same set of optics. Both optical paths share the same optic axis and common line-of-sight. One focal plane is optimized for use with a high performance GEN II image intensifier tube, and the other is used for either laser receiver or emitter devices.

8 Claims, 3 Drawing Sheets

CATADIOPTRIC MULTI-FUNCTIONAL OPTICAL ASSEMBLY

BACKGROUND OF THE INVENTION

1. Field of the Invention

The present invention generally relates to image intensifier objective optics and laser rangefinder-emitter optics. More specifically, to an optical assembly which functions for both an image intensifier objective and a laser rangefinder-emitter.

2. Description of Prior Art

Passive resolution criteria is essential for mission effectiveness in target recognition of a weapon system. Passive target recognition during darkness reduces the need for active illuminating a field of view and also helps to determine more clearly identify the object being viewed. For this reason, the use of image intensified rifle sights has been prevalent in the US military since the late 1960's. More recent developments in electro-optical technology have provided active devices for tactical advantage, including laser range finding and laser target illumination. On modern rifle systems, an image intensified magnifying viewer is attached and boresighted next to the laser emitter/detector assembly. Each of these devices is an independent system, and each is separately affixed and aligned to the rifle.

While the prior art has reported providing the ability to integrate the functions of both active (laser) and passive (image intensifier) sensing systems none have established a basis for a specific small, lightweight assembly that facilitates maintaining common boresight alignment. What is needed in this instance is an optical assembly that provides two different focal planes using optical paths that share the same optic axis, common line-of-sight, and at least several common optical elements.

SUMMARY OF THE INVENTION

It is therefore one object of the invention to provide an optical assembly that provides two different focal planes using optical paths that share the same optic axis, common line-of-sight, and at least several common optical elements.

According to the invention, there is disclosed an optical assembly wherein all the functions of the image intensified viewer, laser receiver and/or laser emitter can be made to share a common optical axis, and also share common optical elements. Common to each lens path is transmission through a first lens element, reflection by a mirror element and re-entrance back into the first lens element, the backside of which is partially coated, over a small internal diameter with a reflective coating. Reemegerence from the first lens element, and incidence onto the first surface of a lens element triplet. At this surface, the ray path depends on the wavelength of the light. For wavelengths above a predetermined threshold, most of the energy is reflected off of the first surface and comes to a focus. If the wavelength is below the predetermined threshold, the light passes through the triplet, through air space to a field lens element, and thence to a high quality focal plane. The invention yields an overall package volume where volume and weight is decreased over prior art separate systems.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The optical system overall is generally described as a catadioptric (having both reflective mirrors and refractive lenses) objective. A central obscuration is utilized that allows inner radial sections of certain elements to be removed so that there is provided two different focal planes using the same set of optics. Both optical paths share the same optic axis and common line-of-sight. It is understood that as different optical properties are desired, the addition of other lens elements to a particular light ray path is within the purview of those skilled in the practice of the art.

Figure 1:
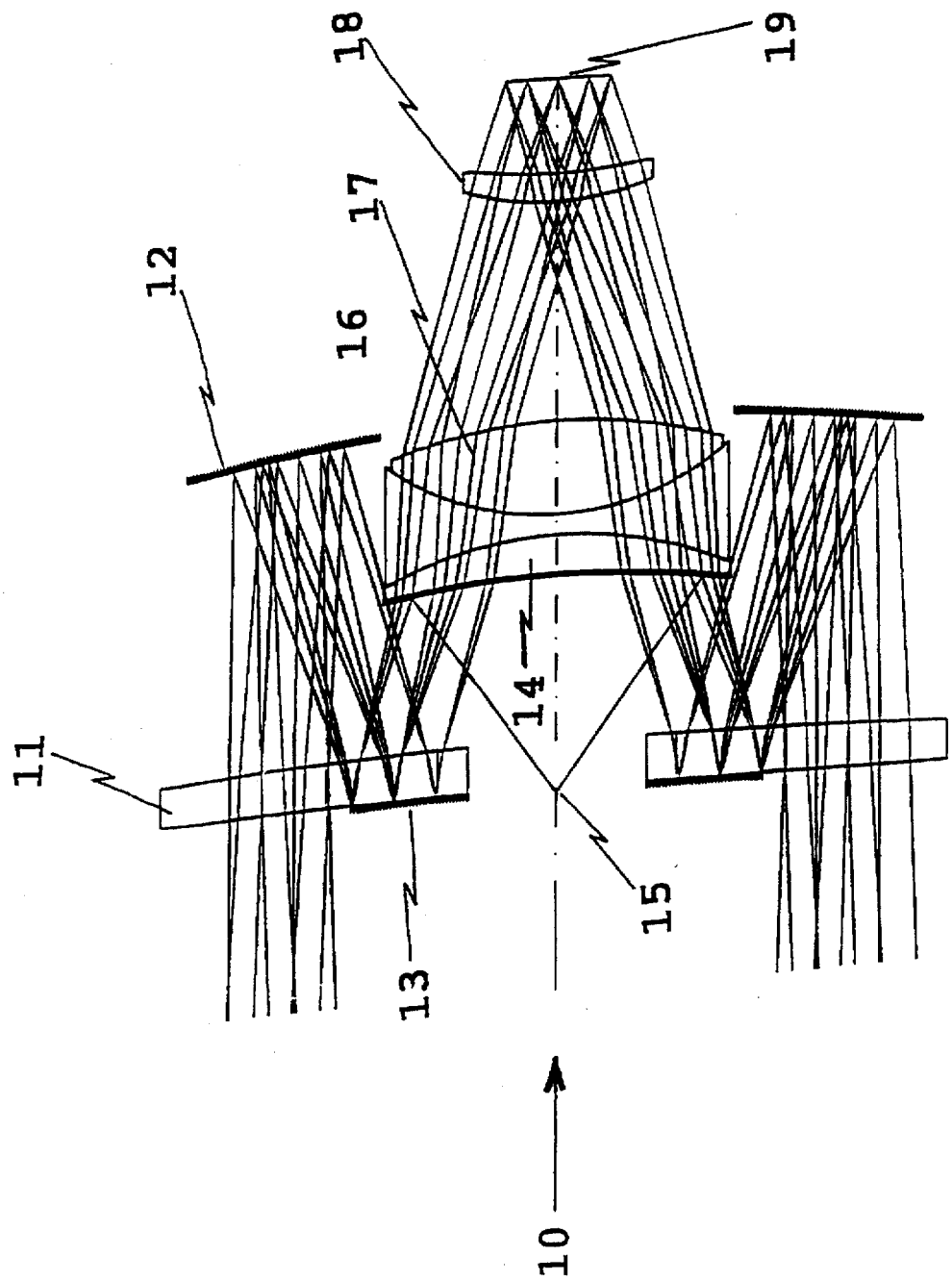
FIG. 1 is an optics layout of superimposed raytraces showing two different optical paths through the same set of lens elements.

Referring now to the drawings, and more particularly to FIG. 1, there is shown an overall view of the invention, consisting of superimposed raytraces showing two different optical paths through the same set of lens elements. Collimated, "infinity source" light is assumed to be incident and traveling to the right as light 10. Light enters the optical assembly of which lens element 11 is of relatively large diameter but which has the center radius of about 15 mm removed. Lens element has a wavelength-selectable reflectance coating on the first surface. Light begins to converge onto mirror 12, which is a metal mirror with slight aspheric power. The central radius portion of mirror 12 is not used optically, and is cut out to make room for the other elements. The light reflected from mirror 12 travels back to the right, and is incident upon lens element 11 again, but this time within an inner annular radius. The back side of lens element 11's inner annular diameter is coated with a reflectance coating shown as surface 13, essentially making this portion a Mangin Mirror, because on reflection, the light makes a second pass through the same element. Surface 13 is chosen as the system aperture stop in order to keep its size minimal. The light is now traveling rightward again, and is incident upon lens element 14, which is the first glass lens of a cemented triplet 14, 16, and 17. Two paths for optical radiation are now possible, depending on the wavelength. If the wavelength is above a certain threshold, the radiation is again reflected leftward, back toward lens element 11, except again within a yet smaller inner radius (0 to about 15 mm). This section of lens element 11 is removed (literally cut out), and thus allows either a photodetector or emitter to be located around the resulting focal plane at focus point 15. If the light is below the reflective threshold, the radiation proceeds through the triplet, onto a final field lens element 18, and thence comes to form a focal plane 19 which in the preferred embodiment operates with a standard 18 mm diameter intensifier tube, but which may also be used for either some other detector or light source.

In the preferred embodiment, lens element 11 has an inner annular radius of 15 to 38 mm which has a wavelength-selectable reflectance coating on the first surface. The central 30 mm radius of mirror 12 is not used optically, and is cut out to make room for the other elements. The inner annular radius of lens element 11 is 15–38 mm. The back side of lens element 11's inner annular diameter is coated with a reflectance coating. The reflectance coating utilized is reflective for wavelengths over 1.0 microns, and transmissive for wavelengths of 0.6–0.9 microns. It is understood that any functionally equivalent reflectance coating may be used. The diameter of the central Obscuration in this catadioptric system is 34.8×2=69.6 mm. This is sufficient to place a pentaprism or reflective relay to make an exiting illuminator path coaxial with the targeting sight. The central obscuration may optionally contain a small scanning mirror, which could expand the effective area covered by a narrow illuminator and possibly reduce the need for tight boresight and high magnification.

A wavelength selectable reflective coating to the surface of glass lens element 14 of the triplet, effectively converts it into a mirror for the selected wavelength region. Examples of commercially available wavelength selectable reflective coatings are available from OPTO-SIGMA INC. of Santa Ana, Calif. The coating may optionally allow percentages of the light of one wavelength spectral band to proceed to both focal planes, if desired. For example, the typical intensifier will be sensitive to optical wavelengths from about 0.6 to 0.9 microns, but a typical "eyesafe" laser may operate at wavelengths of 1.54 microns. The reflective coating would then be designed to reflect most of the energy around 1.54 microns, and transmit the energy at 0.6 to 0.9 microns on toward the intensifier. The reflected light then comes to a focus somewhere near the vertex of the large, first lens element 11, the center of which has been removed. This focal plane can have resolution sufficient for a laser rangefinder receiver or a positional aiming detector, and is accessible for laser coupling optics for a laser emitter, if desired. Due to the fact that an obscuration naturally exists in this area, there is sufficient room for mounting hardware and electronics. The preferred embodiment as disclosed is intended as in no way limiting the claimed invention.

The prescription for the light path (below threshold) to the intensifier is shown in Table 1. All dimensions in Table 1 is given in millimeters and a positive and negative radius indicates the center of curvature is to the right and left respectively according to what is shown in FIG. 1. Although maximum outer diameters are listed in Table 1, the inner cut-out radii are not shown. These radii can be determined by analysis of the ray heights from the optical ray layouts (as known in the art). The data in Table 1 corresponds to the ray path described when below-threshold wavelength light is present.

TABLE 1-continued

| Element Number | Radius | Thickness | Mirror Type | Glass Code |
|---|---|---|---|---|
| | −87.61803 | 37.610520 | | |
| 18 | 48.93864 | 4.707508 | | FK5 SCHOTT |
| | 88.64893 | 15 601136 | | |
| 19 IMG | INFINITY | 0.000000 | | |

The thickness for all the objects described in TABLE 1 is the axial distance to the next surface, and the image diameter shown above is a paraxial value not a ray traced value. The reference wavelength is 721.27 nanometers for the spectral region of 560.82 to 876.22 nanometers. A total weight for the preferred embodiment is approximately 400 grams.

The value "ASP" denotes an aspheric surface which is described in terms of the constants listed in Table 2 below:

TABLE 2

$CURV = 1/-331.32858$
$K = -0.705975$
$A = 0.714978E-08$
$B = -.21154E-11$
$o = 0.850727E-15$
$D = -.100691E-18$ which were derived using the following equation:

$$Z = \frac{(CURV)Y^2}{1+(1-(1+K)(CURV)^2Y^2)^{1/2}} + (A)Y^4 + (B)Y^6 + (C)Y^8 + (D)Y^{10}$$

Table 2 lists the mild aspheric coefficients for the reflective metal mirror, which is common to all optical pathways. The aspheric provides an improvement in the MTF of the intensifier objective optical path.

Glass materials utilized for the lens elements are also described in TABLE 1 by glass code (known in the art) and indices of refraction, but each lens element may be made of other materials that are functionally equivalent. The refractive indices at respective wavelengths (nm) are shown in TABLE 3 for the glass code utilized since glass compositions in the art may change over time.

TABLE 3

| GLASS CODE | 76.22 nm | 831.87 nm | 777.41 nm | 721.27 nm | 665.2 nm |
|---|---|---|---|---|---|
| BK7 SCHOTT | 1.509393 | 1.510172 | 1.5]1241 | 1.512520 | 1.51404 |
| FK5 SCHOTT | 1.481004 | 1.481699 | 1.482647 | 1.483772 | 1.48510 |
| LAKN12 SCHOTT | 1.667147 | 1.668212 | 1.669708 | 1.671541 | 1.67377 |
| SK15 SCHOTT | 1.613486 | 1.614440 | 1.6].5773 | 1.617399 | 1.61937 |
| SK16 SCHOTT | 1.611171 | 1.612115 | 1.613426 | 1.615012 | 1.61692 |

It is understood that the invention is not limited to the glass types listed in the preferred embodiment.

Table 4 lists the First Order Parameters for the intensifier objective as shown in FIG. 1.

TABLE 1

| Element Number | Radius | Thickness | Mirror Type | Glass Code |
|---|---|---|---|---|
| OBJ | INFINITY | INFINITY | | |
| 11 | 1887.53896 | 8.000000 | | BK7 SCHOTT |
| | −969.23662 | 55.000000 | | |
| 12 ASP | −331.32858 | −55.000000 | REFL | |
| 11 | −969.23662 | −8.000000 | | BK7 SCHOTT |
| 13 STO | −1887.53896 | 8.000000 | REFL | BK7 SCHOTT |
| 11 | −969.23661 | 28.000000 | | |
| 14 | −166.53640 | 7.131938 | | SKI5 SCHOTT |
| 16 | −66.40878 | 3.500000 | | LAKN12 SCHOTT |
| 17 | 45.89782 | 16.025090 | | SKI6 SCHOTT |

TABLE 4

| FOCAL LENGTH | |
|---|---|
| EFL | 148.9970 |
| BFL | 15.4812 |
| FFL | 47.9476 |
| FOCAL IMAGE | |
| F# | 1.3545 |

TABLE 4-continued

| | |
|---|---|
| IMG DIS | 15.6011 |
| OAL | 104.9751 |
| PARAXIAL IMAGE | |
| HT | 8.7477 |
| ANG | 3.3600 |
| ENTRANCE PUPIL | |
| DIA | 110.0000 |
| THI | 160.6700 |
| EXIT PUPIL | |
| DIA | 145.3987 |
| THI | -181.4640 |

The focal length of 149 mm over an image height format of +/-8.75 mm gives a field of view of +/-3.36 degrees, which is common for a typical intensified targeting sight. The F# is listed as 1.35, which is typically required to gain low light level sensitivity for an intensifier, but losses occur due to the central obscuration.

Table 5 is a description of the transmission characteristics of the objective. The transmission calculations were based on: coatings index of 1.380, coatings optimized for thickness of 0.250 waves at 721.27 nm, a cement index of 1.559, v/no or 44.6, no cement absorption, and reflection losses at cemented interfaces are average values. The results shown in Table 6 indicate excellent performance for the spectral response band common to military GEN II intensifier tubes, but does not account for the specific design of the special wavelength-selective coating on element.

TABLE 5

| Surface NO. | source | 876.2 nm | 831.9 nm | 777.4 nm | 721.3 nm | 665.3 nm | 614.7 nm | 560.8 nm | Total |
|---|---|---|---|---|---|---|---|---|---|
| 1 | REF | 1.0000 | 1.0000 | 1.0000 | 1.0000 | 1.0000 | 1.0000 | 1.0000 | 1.0000 |
| 2 | REF | 0.9845 | 0.9854 | 0.9864 | 0.9868 | 0.9864 | 0.9849 | 0.9815 | 0.9860 |
| | ABS | 0.9988 | 0.9988 | 0.9987 | 0.9985 | 0.9985 | 0.9985 | 0.9985 | 0.9986 |
| 3 | REF | 0.9844 | 0.9854 | 0.9864 | 0.9868 | 0.9865 | 0.9849 | 0.9816 | 0.9860 |
| 4 | REF | 1.0000 | 1.0000 | 1.0000 | 1.0000 | 1.0000 | 1.0000 | 1.0000 | 1.0000 |
| 5 | REF | 0.9841 | 0.9851 | 0.9862 | 0.9868 | 0.9866 | 0.9853 | 0.9823 | 0.9859 |
| | ABS | 0.9987 | 0.9987 | 0.9986 | 0.9984 | 0.9984 | 0.9984 | 0.9984 | 0.9985 |
| 6 | REF | 1.0000 | 1.0000 | 1.0000 | 1.0000 | 1.0000 | 1.0000 | 1.0000 | 1.0000 |
| | ABS | 0.9987 | 0.9987 | 0.9986 | 0.9984 | 0.9984 | 0.9984 | 0.9984 | 0.9985 |
| 7 | REF | 0.9840 | 0.9850 | 0.9861 | 0.9867 | 0.9866 | 0.9855 | 0.9825 | 0.9859 |
| 8 | REF | 0.9878 | 0.9897 | 0.9917 | 0.9929 | 0.9930 | 0.9913 | 0.9867 | 0.9915 |
| | ABS | 0.9991 | 0.9991 | 0.9990 | 0.9989 | 0.9989 | 0.9989 | 0.9984 | 0.9990 |
| 9 | REF | 0.9981 | 0.9981 | 0.9981 | 0.9981 | 0.9981 | 0.9981 | 0.9982 | 0.9981 |
| | ABS | 9.9962 | 0.9962 | 0.9962 | 0.9956 | 0.9956 | 0.9956 | 0.9956 | 0.9959 |
| 10 | REF | 0.9982 | 0.9982 | 0.9982 | 0.9982 | 0.9982 | 0.9982 | 0.9982 | 0.9982 |
| | ABS | 0.9985 | 0.9985 | 0.9983 | 0.9982 | 0.9980 | 0.9980 | 0.9971 | 0.9983 |
| 11 | REF | 0.9867 | 0.9887 | 0.9908 | 0.9921 | 0.9927 | 0.9915 | 0.9876 | 0.9907 |
| 12 | REF | 0.9826 | 0.9834 | 0.9842 | 0.9846 | 0.9844 | 0.9833 | 0.9807 | 0.9839 |
| | ABS | 0.9997 | 0.9997 | 0.9995 | 0.9993 | 0.9991 | 0.9991 | 0.9991 | 0.9994 |
| 13 | REF | 0.9824 | 0.9832 | 0.9840 | 0.9845 | 0.9844 | 0.9835 | 0.9811 | 0.9839 |

Figure 2:
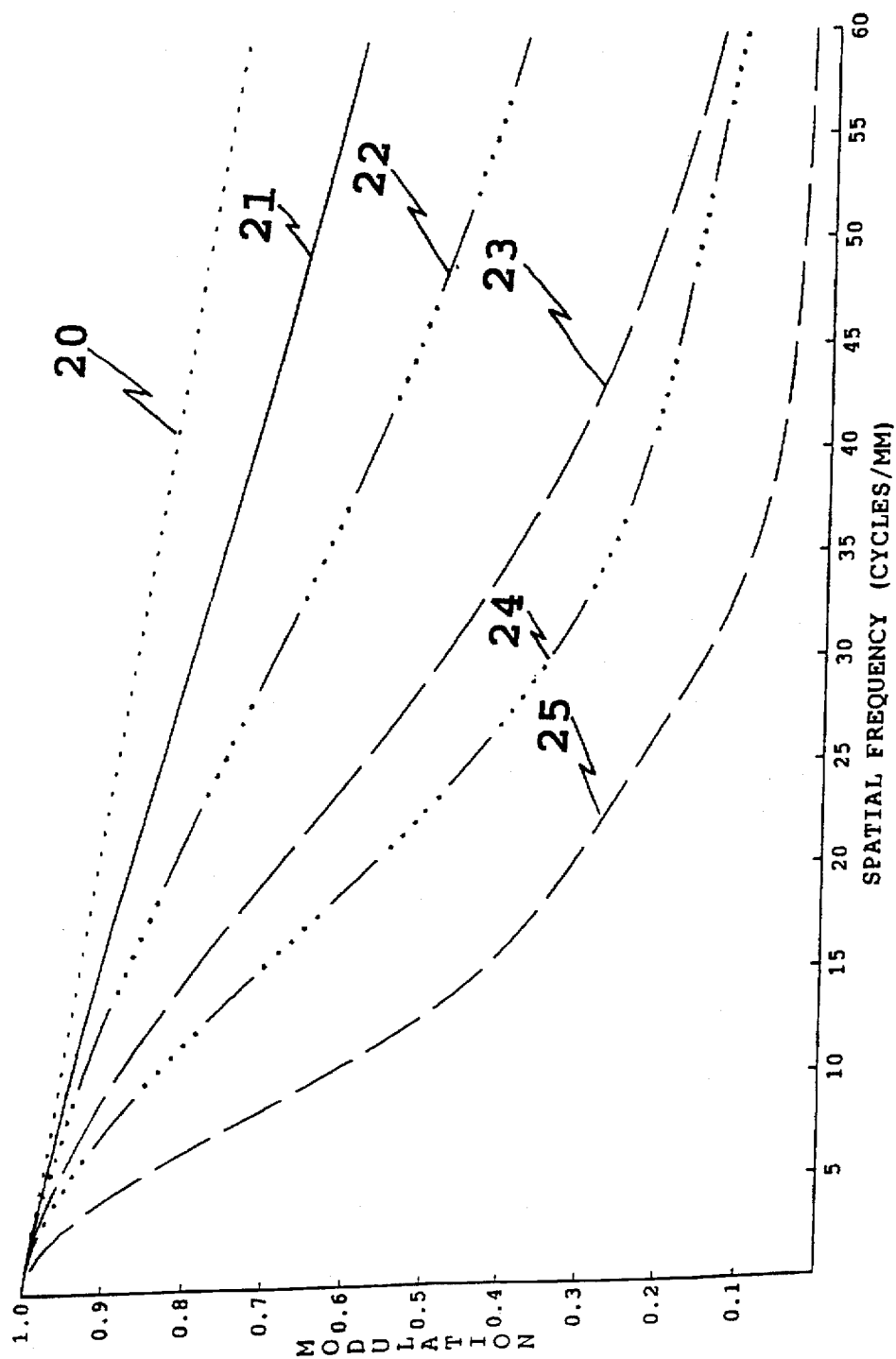
FIG. 2 is a graph of the polychromatic Modulation Transfer Function for the intensifier objective optical path of FIG. 1.

The parameters of the optical assembly of the preferred embodiment are as follows:
a) F#/1.35
b) Transmission in GEN II intensifier spectrum average= 89%
c) Obscuration-Aperture Area Ratio=$(34.8)^2 \div (55.0)^2$= 0.40
d) Effective Transmission=(0.89) (0.60)=0.534
e) T#=F# divided by square root of transmission=1.85
f) Approximate optical element weight=700 grams
g) FOV=6.72°
h) 17.5 mm Active intensifier format
i) 6× System Magnification with a 40° apparent FOV Eyepiece
j) Optics MTF On-Axis>70% at 50 lp/mm (comparable to PVS-4 objective)
k) Metal mirror Is Slightly Aspheric to enhance Resolution FIG. 2 is a graph of the polychromatic Modulation Transfer Function, a common measurement of optical resolution, for the intensifier objective optical path. Line 20 represents the theoretical best, diffraction limited MTF. Line 21 is the designed on-axis, zero degree field of view MTF. Lines 21 and 22 are the radially and tangentially oriented MTF's for +/-1.68 degrees, which is half of the field of view. Lines 24 and 25 show radial and tangential MTF resolution at the edge of the field of view. Performance is comparable to the Army's current PVS-4 objective, and provides ample optical resolution (greater than 50% modulation) for intensifier tubes with resolutions of 60 lp/mm or more. Table 6 discloses wavelength versus weight factor parameters for FIG. 2.

TABLE 6

| Wavelength(nm) | Weight factor |
|---|---|
| 876.2 | 26 |
| 831.9 | 89 |
| 777.4 | 99 |
| 721.3 | 88 |
| 665.3 | 69 |

TABLE 6-continued

| Wavelength(nm) | Weight factor |
|---|---|
| 641.7 | 35 |
| 560.8 | 1 |

Figure 3:
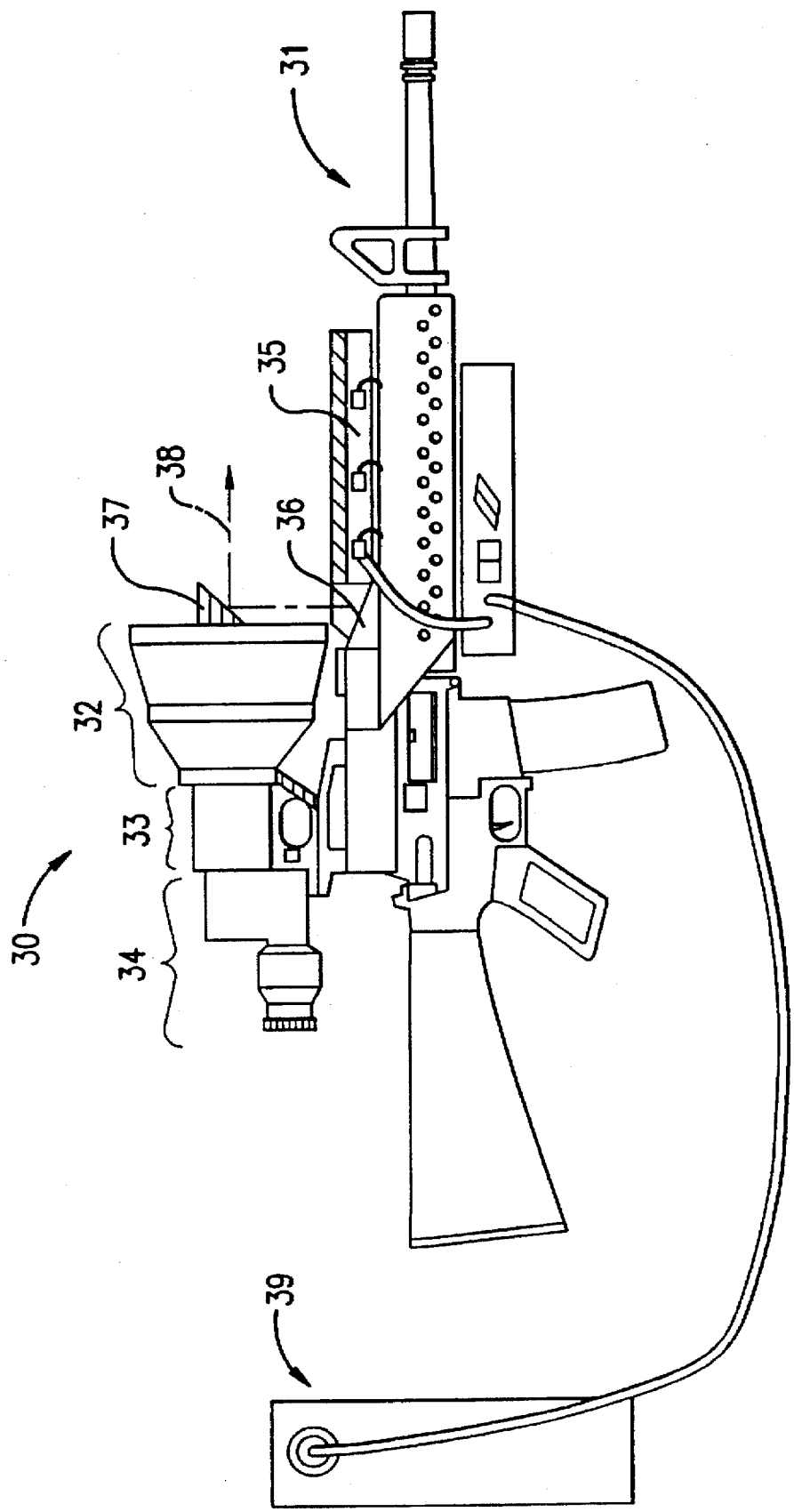
FIG. 3 is a side view of the invention utilized in a rifle system.

FIG. 3 is a side view of the invention utilized in the preferred embodiment of a rifle system. It is understood that while a rifle system is utilized in the preferred embodiment that any other weapon system may used, such as the TOW weapons system. Rifle 30 is shown in FIG. 3 with viewer subsystem 31 coupled thereto. Viewer subsystem 31 includes optics assembly of the present invention housed within mounting section 32, intensifier section 33, and eyepiece/reticule section 34. A rangefinder/emitter subsystem may include a eyesafe laser emitter 35 coupled above rifle 31 and optically aligned to emit laser energy which is reoriented by mirrors 36 and 37 to emit laser energy which is optically aligned to the middle cut-out section of the optics assembly toward an intended target in direction 38 as shown in FIG. 3. Incoming light from object scenery, including reflected laser energy from laser emitter 35, is received within the outer annular lens of the optics assembly. If the wavelength of the incoming light is above a threshold of 1.1 microns, the radiation is reflected within the optics assembly to be received by a photodetector within the center of the optics assembly. If the wavelength of the incoming light is below the reflective threshold of 1.1 microns, the radiation proceeds through to a focal plane of a 18 mm diameter intensifier tube.

The weapons system shown in FIG. 3 may include backpack 39 containing batteries and additional processing electronics. Within the middle cut-out section of the optics assembly may be an IR illuminator or laser receiver. The IR illuminator would be used for large area scene illumination when conditions do not allow enough natural starlight for the intensifier to operate. The laser receiver would be used to detect the position of the laser beam whose wavelength is outside the range detected by the intensified sight. Depending on the desired configuration, it is possible to direct the laser beam into the objective, and thereby take advantage of a common optical axis between the intensified imagery and the laser direction. If only the IR illuminator function is desired, the laser and backpack assemblies need not be present. Or, if only low power laser radiation is required, then a diode emitter could be mounted directly inside the objective lens assembly.

The overall result is that a single set of optics, aligned along a single optical axis, can provide multiple functions for devices operating in different spectral bands. Other configurations may also be considered. For example, a laser emitter or a 0.6 to 0.9 micron band aiming light may be substituted in place of the receiver. Also, due to the obscuration, there is also a capacity to mount a third receiver/emitter with its own separate optics along the common optical axis. Or, an "eyesafe" laser may be mounted and boresighted to the rifle itself, and a locational detector may be used in the intensifier objective/receiver optics to allow the user to "see" where the laser spot is hitting overlaid onto the intensified imagery.

Due to the weight and aperture sizes required for low light level performance, a 6x system is about the limit for high magnification and passive 12 performance in a hand-held weapon. The 6x is an adequate single FOV for both long and near range targets. At shorter ranges of about 500 meters, a 6.72° FOV subtends about 60 meters horizontally, which is not excessive for searching out man-size targets.

The preferred embodiment allows for a large area photodetector, or perhaps a "quad" arrangement of four positional photosensors. Additional configurations can be considered by making use of the relatively large obscured circular area. It is possible, for example, to mount a photodetector, reflective relay, or CCD in the focus point 15 of FIG. 1 (shown as box 15a), and then on the other side locate a either a self-contained light emitter or a scanner or prism to bring another light source co-axial with the intensifier/photosensor. The flexibility of several practical configurations lends itself to uses combining image intensified viewing with aiming lights, and eyesafe laser rangefinders.

While this invention has been described in terms of preferred embodiment consisting of a rifle system, those skilled in the art will recognize that the invention can be practiced with modification within the spirit and scope of the appended claims.

Having thus described my invention, what we claim as new and desire to secure by Letters Patent is as follows:

1. A catadioptic optical assembly for providing two different focal planes within the assembly, the assembly comprising:

an objective lens element with first and second surfaces, the element including an inner annular portion cut-out, and the element further having a mirrored reflectance coating on an annular portion of said first surface;

an annular mirror having a reflective surface facing the objective lens element, the mirror including an inner annular portion cut-out;

a lens group with a first and last surface, the first surface including a wavelength selectable reflective coating for focusing wavelength selected radiation onto a first focal plane in front of the lens group, the lens group positioned in between the objective lens element and the annular mirror, and the lens group also positioned concentric to the inner annular portion cut-outs of both objective lens element and annular mirror, so that wavelength selected radiation not diverted by the wavelength selectable coating pass through the last surface onward to a field lens element;

a field lens element for focusing exit radiation from the lens group onto a second focal plane;

a first optical path extending from the objective lens element to the reflective surface of the annular mirror, backward through the objective lens element to the mirrored reflectance coating, forward to the wavelength-selectable reflectance coating, and backward to the first focal plane;

a second optical path extending from the objective lens element to the reflective surface of the annular mirror, backward through the objective lens element to the mirrored reflectance coating, forward through the lens group and field lens element to the second focal plane, whereby there is focused radiation of a selected wavelength onto the first focal plane located approximate the objective lens inner annular portion cut-out, and radiation of other selected wavelengths is focused onto the second focal plane located after the field lens element.

2. The catadioptic optical assembly of claim 1 wherein said lens group is a cemented lens triplet.

3. The catadioptic optical assembly of claim 1 wherein said first focal plane is an input to a reflective relay.

4. The catadioptic optical assembly of claim 1 wherein said first focal plane is an input to a laser detector.

5. The catadioptic optical assembly of claim 1 wherein said first focal plane is an input to a laser emitter.

6. The catadioptic optical assembly of claim 1 wherein said first focal plane is an input to a diode illuminator source.

7. The catadioptic optical assembly of claim 1 wherein said second focal plane is an input to a image intensifier.

8. The catadioptic optical assembly of claim 1 wherein said second focal plane is an input to a CCD camera detector.

* * * * *